(12) United States Patent
Yang

(10) Patent No.: US 11,071,115 B2
(45) Date of Patent: Jul. 20, 2021

(54) INFORMATION PROCESSING METHOD AND RELATED PRODUCT

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 53 days.

(21) Appl. No.: 16/605,754

(22) PCT Filed: Jun. 9, 2017

(86) PCT No.: PCT/CN2017/087826
§ 371 (c)(1),
(2) Date: Oct. 16, 2019

(87) PCT Pub. No.: WO2018/223405
PCT Pub. Date: Dec. 13, 2018

(65) Prior Publication Data
US 2021/0014876 A1    Jan. 14, 2021

(51) Int. Cl.
*H04B 7/0408*    (2017.01)
*H04B 17/309*    (2015.01)
(Continued)

(52) U.S. Cl.
CPC ........ *H04W 72/046* (2013.01); *H04B 7/0408* (2013.01); *H04B 17/309* (2015.01);
(Continued)

(58) Field of Classification Search
CPC ..... H04B 7/0408; H04B 17/0082–3913; H04J 11/0023–0093; H04J 2011/0003–0096;
(Continued)

(56) References Cited

U.S. PATENT DOCUMENTS

2013/0235742 A1* 9/2013 Josiam ................ H04W 72/046
2014/0112269 A1   4/2014 Yu et al.
(Continued)

FOREIGN PATENT DOCUMENTS

CN    101088303    12/2007
CN    101340232    1/2009
(Continued)

OTHER PUBLICATIONS

CMCC, "On the Number of Beams to Derive Cell Quality," 3GPP TSG-RAN WG2 Meeting #98, R2-1705793, May 2017, 4 pages.
(Continued)

*Primary Examiner* — Timothy J Weidner
(74) *Attorney, Agent, or Firm* — Hodgson Russ LLP

(57) ABSTRACT

An information processing method and related product. The method comprises: a user equipment unit acquiring a mapping relationship between N and M, N being a maximum number of beams for acquiring cell quality, and U being an actual number of beams sent by a network apparatus; and the user equipment unit determining, according to the mapping relationship between N and M and/or, N. The method enables determination of the number of beams required to be measured.

17 Claims, 5 Drawing Sheets

(51) Int. Cl.

| | | |
|---|---|---|
| *H04L 5/00* | (2006.01) | |
| *H04W 8/22* | (2009.01) | |
| *H04W 24/10* | (2009.01) | |
| *H04W 56/00* | (2009.01) | |
| *H04W 72/04* | (2009.01) | |
| *H04W 72/08* | (2009.01) | |
| *H04W 72/12* | (2009.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |

(52) U.S. Cl.
CPC .......... *H04L 5/0076* (2013.01); *H04L 5/0096* (2013.01); *H04W 8/22* (2013.01); *H04W 24/10* (2013.01); *H04W 56/001* (2013.01); *H04W 72/042* (2013.01); *H04W 72/085* (2013.01); *H04W 72/1263* (2013.01); *H04W 72/1289* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .. H04J 2011/0096; H04L 5/003–0098; H04W 8/22–245; H04W 24/02–10; H04W 36/0005–385; H04W 40/005–38; H04W 48/02–20; H04W 56/001–0025; H04W 72/005–14; H04W 74/002–008; H04W 84/02–06; H04W 88/02–12; H04W 92/02; H04W 92/04; H04W 92/10; H04W 92/12; H04W 92/16; H04W 92/20; H04W 92/22

See application file for complete search history.

(56) References Cited

U.S. PATENT DOCUMENTS

| | | | | |
|---|---|---|---|---|
| 2016/0150435 | A1 | 5/2016 | Baek et al. | |
| 2019/0335376 | A1* | 10/2019 | Huang | ................ H04W 72/046 |
| 2020/0145981 | A1* | 5/2020 | Harada | ............... H04W 72/044 |

FOREIGN PATENT DOCUMENTS

| | | |
|---|---|---|
| CN | 103688474 | 3/2014 |
| CN | 104796185 | 7/2015 |
| CN | 105007126 | 10/2015 |
| KR | 20140090495 | 7/2014 |

OTHER PUBLICATIONS

Samsung, "RRM Measurement in NR: The Details of Cell Quality Derivation," 3GPP TSG RAN WG2 #97bis, R2-1703722, Apr. 2017, 5 pages.

EPO, Office Action for EP Application No. 17912533.1, dated Mar. 2, 2020.

NTT DOCOMO, Inc., "Evaluation for Beam Management," 3GPP TSG RAN WG1 Meeting #89, R1-1708453, May 2017, 9 pages.

WIPO, ISR for PCT/CN2017/087826, dated Mar. 8, 2018.

SIPO, First Office Action for CN Application No. 201780088666.9, dated Jun. 1, 2020.

IPI, Office Action for IN Application No. 201917042627, dated May 10, 2021.

* cited by examiner

INFORMATION PROCESSING METHOD AND RELATED PRODUCT

CROSS-REFERENCE TO RELATED APPLICATIONS

This application is a U.S. national phase application of International Application No. PCT/CN2017/087826, filed Jun. 9, 2017, the entire disclosure of which is incorporated herein by reference.

TECHNICAL FIELD

The present disclosure relates to the field of communication technologies, and in particular, to a method and related product for information processing.

BACKGROUND

In the 5-Generation (5G) mobile communication technology or New Radio (NR), due to the introduction of more beams, the situation of beams in a traditional cell being invisible to a User Equipment (UE) has been changed. In 5G or NR, the UE may distinguish not only a cell which it resides in or services, but also a beam which it resides in or services.

When performing a beam measurement of a local cell or a neighboring cell, a numeral number N of beams to be measured is configured for the UE through the network. In the current standard protocol, obtaining a cell quality (including strength of cell signal and quality of cell signal) requires the UE to average the N beams, and the qualities of the N beams are all greater than a threshold. However, due to the difference in the number of beams between cells in different frequency bands and even different cells in a same frequency band, the number of beams to be measured cannot be uniformly configured for all cells. Therefore, determining the number of beams which need to be measured is a technical problem that needs to be solved.

SUMMARY

Embodiments of the present disclosure provide a method and related products for information processing.

In a first aspect, an embodiment of the present disclosure provides a method for information processing, comprising:

obtaining, by a user equipment, a mapping relationship between N and M, wherein the N is a maximum number of beams for obtaining a cell quality, and the M is a number of beams actually sent by a network equipment;

determining, by the user equipment, the N based on the mapping relationship between the N and the M, and/or the M.

In a second aspect, an embodiment of the present disclosure provides a method for information processing, comprising:

sending, by a network equipment, a configured mapping relationship between N and M which is used to determine the N, wherein the N is a number of beams which need to be measured, and the M is a number of beams actually supported by the network equipment.

In a third aspect, an embodiment of the present disclosure provides a user equipment, comprising a processing unit, wherein the processing unit is configured to obtain a mapping relationship between N and M, wherein the N is a maximum number of beams for obtaining a cell quality, and the M is a number of beams actually sent by the network equipment; the N is determined based on the mapping relationship between the N and the M, and/or the M.

In a fourth aspect, an embodiment of the present disclosure provides a network equipment, comprising a communication unit and a processing unit, wherein the processing unit is configured to send, by using the communication unit, a configured mapping relationship between N and M, wherein the N is a number of beams to be measured, and the M is a number of beams actually supported by the network equipment, wherein the mapping relationship between the N and the M is used to determine the N.

In a fifth aspect, an embodiment of the present disclosure provides a user equipment, comprising one or more processors, one or more memories, one or more transceivers, and one or more programs;

wherein the one or more programs are stored in the memory and configured to be executed by the one or more processors;

wherein the program comprises instructions for performing steps in the method as described in the first aspect of the embodiments of the present disclosure.

In a sixth aspect, an embodiment of the present disclosure provides a network equipment, comprising one or more processors, one or more memories, one or more transceivers, and one or more programs;

wherein the one or more programs are stored in the memory and configured to be executed by the one or more processors;

wherein the program comprises instructions for performing steps in the method in the second aspect of the embodiments of the present disclosure.

In a seventh aspect, an embodiment of the present disclosure provides a computer readable storage medium, the computer readable storage medium stores a computer program for exchanging electronic data, and the computer program causes a computer to perform the method of the first aspect of the embodiments of the present disclosure.

In a eighth aspect, an embodiment of the present disclosure provides a computer readable storage medium, the computer readable storage medium stores a computer program for exchanging electronic data, and the computer program causes a computer to perform the method of the second aspect of the embodiments of the present disclosure.

In a ninth aspect, an embodiment of the present disclosure provides a computer program product, the computer program product comprises a non-transitory computer readable storage medium storing a computer program, and the computer program may be operated to cause a computer to perform the method of the first aspect of the embodiments of the present disclosure.

In a tenth aspect, an embodiment of the present disclosure provides a computer program product, the computer program product comprises a non-transitory computer readable storage medium storing a computer program, and the computer program may be operated to cause a computer to perform the method of the second aspect of the embodiments of the present disclosure.

These and other aspects of the present application will be more concise and easy to be understood in the following description of embodiments.

BRIEF DESCRIPTION OF THE DRAWINGS

Accompanying drawings used to describe embodiments or the prior art will be introduced briefly below in order to illustrate the technical solutions in embodiments of the present disclosure more clearly. Obviously, the accompanying drawings in the following description are for some embodiments of the present disclosure, and other drawings can also be obtained based on these accompanying drawings by a person having ordinary skill in the art without creative efforts.

DETAILED DESCRIPTION

In order to enable those skilled in the art to better understand solutions of the present application, the technical solutions in embodiments of the present application are clearly and completely described in the following with reference to accompanying drawings in the embodiments of the present application. Obviously, the described embodiments are merely a part of embodiments of the present application but not all of the embodiments. All other embodiments obtained by those skilled in the art based on the embodiments of the present application without creative efforts shall fall within the scope of the present disclosure.

The details are described below separately.

The terms "first", "second", "third", "fourth" and so on in the specification, claims and the drawings of the present application are used to distinguish different objects, and are not used to describe a specific order. Furthermore, the terms "comprise" and "include", and any other form of these terms, are intended to cover a non-exclusive inclusion. For example, a process, method, system, product, or equipment that comprises a series of steps or units is not limited to the listed steps or units, but optionally also comprises steps or units not listed, or alternatively comprises other steps or units inherent to this process, method, product or equipment.

References to "an embodiment" herein mean that a particular feature, structure, or characteristic described with reference to the embodiments may be included in at least one embodiment of the present application. The appearances of this phrase in various places in the specification do not necessarily refer to the same embodiments, and are not exclusive or alternative embodiments that are mutually exclusive with other embodiments. Those skilled in the art will understand and implicitly understand that the embodiments described herein may be combined with other embodiments.

Embodiments of the present application will be described below with reference to the accompanying drawings.

Figure 1:
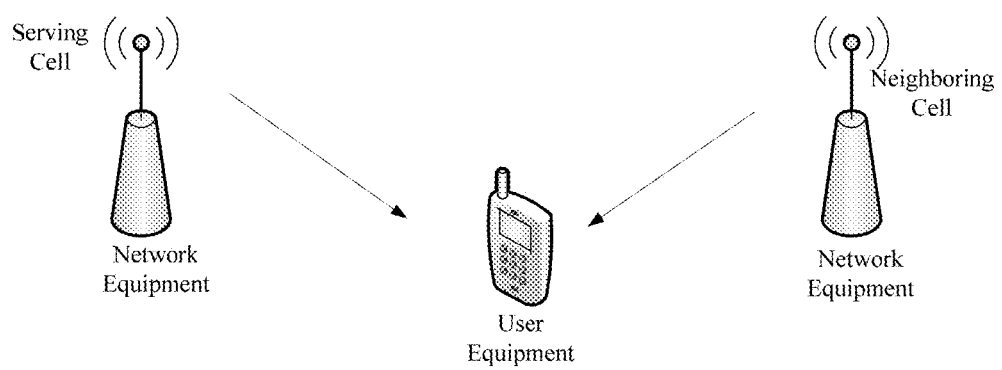
FIG. 1 is a schematic diagram of a network architecture according to an embodiment of the present disclosure.

Referring to FIG. 1, FIG. 1 is a schematic diagram of a network architecture according to an embodiment of the present application. The network architecture shown in FIG. 1 comprises a user equipment 110 and a network equipment 120. The network equipment 120 may be a network equipment of a serving cell, or a network equipment of a neighboring cell. When performing a beam measurement of a local cell or a neighboring cell, a numeral number N of beams to be measured is configured for the user equipment through the network. Due to the difference in the number of beams between cells in different frequency bands and even different cells in a same frequency band, the number of beams to be measured cannot be uniformly configured for all cells. At present, the easiest way to configure the number N of beams to be measured is: since a serving cell knows the number of all the beams in the cell, the N value of the cell may be directly configured by the serving cell; however, for a neighboring cell, the neighboring cell needs to inform the N value to be configured or the number of beams supported by the neighboring cell to the serving cell, and the serving cell configures the N value based on the interactive information. A problem existing in configuring the N value of the neighboring cell is that if the N value of the neighboring cell is configured by the serving cell, the serving cell and the neighboring cell are required to perform information interaction, or the serving cell obtains configuration information of the neighboring cell through configuration of network management in advance. Since there is no interface between the serving cell and the neighboring cell, this configuration mode is not applicable.

In order to solve this problem, in the present solution, a mapping relationship between N and M is pre-configured, the N is a maximum number of beams to obtain a cell quality, and the M is a numeral number of beams actually sent by a network equipment. Then, a user equipment may obtain the value of N based on the mapping relationship and/or the M and further solves the problem that the value of N cannot be uniformly configured.

The mapping relationship between the N and the M obtained by the user equipment is configured for the user equipment 110 by the network equipment 120 of the serving cell, or is pre-defined in the protocol, etc.

A User Equipment (UE) is an equipment that provides voice and/or data connectivity to a user, for example, a handheld device with a wireless connection function, an in-vehicle device, and the like. A common User Equipment includes, for example, a mobile phone, a tablet, a notebook computer, a PDA, a Mobile Internet Device (MID) and a wearable device, such as a smart watch, a smart bracelet, a pedometer, and the like.

The network equipment refers to a node equipment on the network side. For example, the network equipment may be a Radio Access Network (RAN) device on the access network side of a cellular network, and the so-called RAN device is a device that connects a user equipment to a wireless network, including but not limited to: an evolved Node B (eNB), a Radio Network Controller (RNC), a Node B (NB), a Base Station Controller (BSC), a Base Transceiver Station (BTS), a Home Base Station (for example, Home evolved NodeB, or Home Node B, HNB), a Baseband Unit (BBU), and a Mobility Management Entity (MME); for another example, the network equipment may also be a node device in a Wireless Local Area Network (WLAN), such as an Access Controller (AC), a gateway, or a WIFI Access Point (AP).

The method for information processing provided by an embodiment of the present application is described in detail below with reference to the network architecture shown in FIG. 1.

Figure 2:
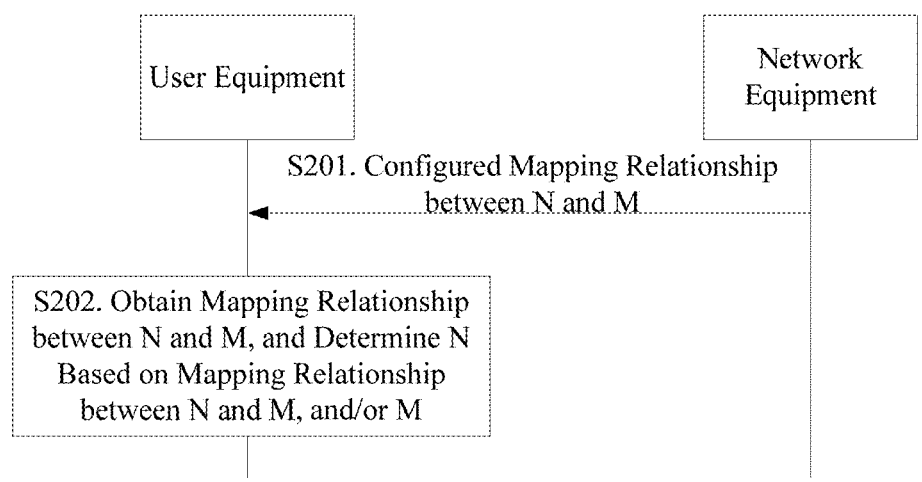
FIG. 2 is a flow chart of a method for information processing according to an embodiment of the present disclosure.

Referring to FIG. 2, FIG. 2 is a flow chart of a method for information processing according to an embodiment of the present disclosure, including the following steps:

Step S201: A network equipment sends a configured mapping relationship between N and M, the N is a maximum number of beams for obtaining a cell quality, the M is a number of beams actually sent by the network equipment, the N and the M are integers greater than or equal to 1, and the M is greater than or equal to the N.

Step S202: A user equipment obtains the mapping relationship between the N and the M, and determines the N based on the mapping relationship between the N and the M, and/or the M.

The N is the maximum number of beams for obtaining the cell quality, which means how many beams are at most needed to obtain the cell quality. For example, it takes up to 5 beams to obtain the cell quality, then N=5.

In addition, the M that is the number of beams actually sent by the network equipment refers to the total number of beams actually supported by the cell where the network equipment is located. For example, the total number of beams supported by the cell where the network equipment is located is 10, then M=10.

In an example, the above mapping relationship between the N and the M is a table, and the table records the N value corresponding to each M value, as shown in Table 1.

TABLE 1

| M | N |
|---|---|
| 10 | 5 |
| 11 | 5 |
| 12 | 5 |
| 13 | 6 |
| 14 | 6 |
| 15 | 7 |
| . | . |
| . | . |
| . | . |

In an example, the above mapping relationship between the N and the M is a table, and the table records the value of N corresponding to each range of M values, as shown in Table 2.

TABLE 2

| M | N |
|---|---|
| 1~10 | 5 |
| 11~20 | 10 |
| 21~33 | 15 |
| 34~50 | 22 |
| . | . |
| . | . |
| . | . |

In an example, the above mapping relationship between the N and the M is a formula, N=M*X. The X is less than 1 and greater than 0, the X is configured by the network equipment, or the X is pre-agreed. For example, when X=0.5 and M=30, assume N=6.

Further, the X corresponding to different M values is the same. For example, when M=10 or M=30, each X is equal to 0.5.

Further, the X corresponding to different ranges of M values is different. For example, when M=1 to 10, X=0.6; when M=20 to 30, X=0.5.

Further, when M1 is greater than M2, the X value corresponding to the M1 is smaller than the X value corresponding to the M2. For example, when M1=30, X=0.5; when M2=10, X=0.6.

In an example, the above mapping relationship between the N and the M is a formula, N=M−Y. The Y is greater than or equal to 1 and less than the M, the Y is configured by the network equipment, or the Y is pre-agreed. For example, when Y=10 and M=30, N=5.

Further, the Y corresponding to different M values is the same. For example, when M=10 or M=15, each Y is equal to 0.5.

Further, the Y corresponding to different ranges of M values is different. For example, when M=1 to 10, Y=3; when M=20 to 30, Y=10.

Further, when M1 is greater than M2, the Y value corresponding to the M1 is greater than the Y value corresponding to the M2. For example, when M1=30, Y=10; when M2=10, Y=3.

In an example, the above mapping relationship between the N and the M is a formula, N=M/Z. The Z is greater than or equal to 1 and less than the M, the Z is configured by the network equipment, or the Z is pre-agreed. For example, when Z=3 and M=30, N=10.

Further, the Z corresponding to different M values is the same. For example, when M=10 or M=20, each Z is equal to 2.

Further, the Y corresponding to different ranges of M values is different. For example, when M=1 to 10, Z=2; when M=20 to 30, Z=4.

Further, when M1 is greater than M2, the Z value corresponding to the M1 is greater than the Z value corresponding to the M2. For example, when M1=30, Z=4; when M2=10, Z=2.

In an example, there are a plurality of mapping relationships between N and M, and each mapping relationship between the N and the M corresponds to at least one period. The period corresponding to the mapping relationship between the N and the M is configured by the network equipment, or the period corresponding to the mapping relationship the N and the M is pre-agreed.

Further, periods corresponding to different mapping relationships do not intersect each other.

For example, it is assumed that there are 3 mapping relationships between N and M. These 3 mapping relationships are: mapping relationship 1, mapping relationship 2, and mapping relationship 3. The mapping relationship 1 corresponds to period 1 and period 2, the mapping relationship 2 corresponds to period 3, and the mapping relationship 3 corresponds to period 4. The period 1, the period 2, the period 3, and the period 4 do not intersect each other.

Therefore, the stability of cell quality is different in different periods. Thus, a plurality of the mapping relationships between the N and the M may be configured based on the periods, and a user equipment may flexibly select a more suitable mapping relationship based on time, thereby determining the N value more flexibly.

It should be noted that, although the specific content described above is a detailed description in the case where the mapping relationship between the N and the M is configured by the network equipment for the user equipment, the specific content described above is equally applicable in the case that the mapping relationship between the N and the M is pre-defined in the protocol, which will not be described herein. In addition, some specific embodiments described below are applicable not only when the mapping relationship between the N and the M is configured for the user equipment by the network equipment, but also when the mapping relationship between the N and the M is pre-defined in the protocol, which will not be described herein.

In an example, the method further comprises:

The user equipment measures, after determining the N, a cell beam and averages at most N beams to obtain a cell quality where the network equipment is, and the at most N beams are beams that meet a threshold of beam quality.

Specifically, at most N beams are averaged, that is, when obtaining the cell quality, no more than N beams are averaged. For example, if N=10, a user equipment may average 8 beams or 9 beams, but it may only average up to 10 beams and cannot average more than 10 beams.

The threshold of foregoing beam quality may be configured by a network equipment, or may be pre-defined in the protocol, and the like.

The beam meets the threshold of beam quality, that is, the beam quality is greater than or equal to the threshold of beam quality.

For example, assume N=10, then at most 10 beams, which are used to obtain a cell quality by a user, are beams that are greater than or equal to a threshold of beam quality, and the user equipment averages 8 of the 10 beams to obtain the cell quality which is equal to (Sbeam1+Sbeam2+ . . . +Sbeam8)/8. However, the cell quality obtained by averaging the at most 10 beams by the user equipment is equal to (Sbeam1+Sbeam2+ . . . +Sbeam10)/10.

For another example, when a user equipment needs to measure a cell quality of a local cell, the user equipment first obtains a mapping relationship between N and M. If the mapping relationship between the N and the M is presented in the form of Table 2, when the value of M is known, such as M=30, the user equipment determines from Table 2 that the value of N is 15 based on the value of M. Then, the user equipment averages up to 15 beams to obtain the cell quality of the cell, such as averaging 15 beams, and the obtained cell quality=(Sbeam1+Sbeam2+ . . . +Sbeam15)/15.

Therefore, in the present solution, a mapping relationship between N and M is pre-configured, the N is a maximum number of beams to obtain a cell quality, and the M is a number of beams actually sent by a network equipment. A user equipment may determine the value of N based on the mapping relationship and/or the M and further solves the problem that the value of N cannot be uniformly configured.

In an example, a network equipment sends broadcast information or a dedicated signaling, and the broadcast information or the dedicated signaling comprises the mapping relationship between the N and the M; a user equipment receives the broadcast information or the dedicated signaling from the network equipment to obtain the mapping relationship between the N and the M.

In an example, the dedicated signaling comprises a RRC Reconfiguration signaling. Using a dedicated signaling to send a mapping relationship between N and M may save signaling overhead.

Further, the mapping relationship between the N and the M may be sent to the user equipment by introducing a specific Information Element (IE) in the dedicated signaling.

In an example, the method further comprises:
The network equipment sends system information, and the M is included in the system information;
The user equipment receives the system information from the network equipment to obtain the M which is included in the system information.

In an example, the system information includes Common Resource Configuration information.

Specifically, a piece of 1-bit information may be set (or newly added) in the common resource configuration information, and the 1-bit information is a value of M. For example, if the 1-bit information is 10, it means that M=10. For example, if the 1-bit information is 30, it means that M=30.

Therefore, in the current 5G/NR system, the information which the user equipment must know in cell access includes the system information. The network equipment provides the M to the user equipment through the system information, which may save a scheduling signaling, and may also enable the user equipment to obtain the value of the M in cell access.

In an example, the method further comprises:
The network equipment sends synchronization information, and the M is included in the synchronization information;
The user equipment receives the synchronization information from the network equipment to obtain the M which is included in the synchronization information.

Specifically, since measuring the cell beam quality is for performing cell search, and the purpose of cell search is to ensure that the user equipment obtains time synchronization and frequency synchronization of the system, so that the user equipment saves synchronization information during the process of cell search. Thus, the network equipment provides the M to the user equipment through the synchronization information, which may save a scheduling signaling, and may also enable the user equipment to obtain the value of M at the beginning.

It should be noted that, at least two of the mapping relationship of the N and the M, the X, the Y, the Z, the period corresponding to different mapping relationships, and the threshold of beam quality, are configured for the user equipment by the network equipment. The network equipment may directly configure the at least two types of information for the user equipment. For example, the network equipment directly configures the at least two types of information for the user equipment through broadcast information or the dedicated signaling. Alternatively, the network equipment may separately configure the at least two types of information for the user equipment. For example, the network equipment configures some of the at least two types of information for the user equipment through broadcast information, and then configures the remaining information of the at least two types of information for the user equipment through the dedicated signaling.

Figure 3:
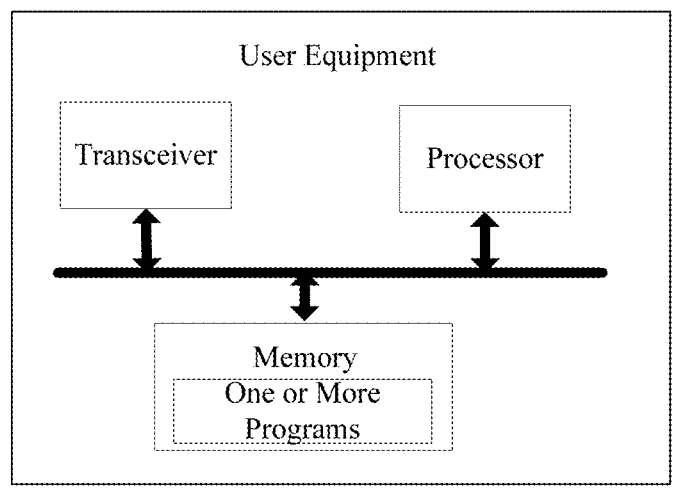
FIG. 3 is a block diagram of a user equipment according to an embodiment of the present disclosure.

Referring to FIG. 3, FIG. 3 is a user equipment 300 according to an embodiment of the present disclosure, comprising: one or more processors, one or more memories, one or more transceivers, and one or more programs.

The one or more programs are stored in the memory and configured to be executed by the one or more processors.

The program comprises instructions for performing the following steps:
obtaining a mapping relationship between N which is a maximum number of beams for obtaining a cell quality and M which is a number of beams actually sent by the network equipment;
determining the N based on the mapping relationship between the N and the M.

In an example, in terms of obtaining the mapping relationship between the N and the M, the program is specifically used to execute instructions of the following step:
receiving broadcast information or a dedicated signaling from the network equipment. The broadcast information or the dedicated signaling comprises the mapping relationship between the N and the M.

In an example, the program is further used to execute instructions of the following step:

receiving system information from the network equipment. The M is included in the system information.

In an example, the program is further used to execute instructions of the following step:

receiving synchronization information from the network equipment. The M is included in the synchronization information.

In an example, the program is further used to execute instructions of the following step:

The user equipment measures, after determining the N, a cell beam and averages at most N beams to obtain a cell quality where the network equipment is, and the at most N beams are beams that meet a threshold of beam quality.

In an example, the mapping relationship between the N and the M is a formula, $N=M/Z$, the Z is greater than or equals to 1, and the Z is configured by the network equipment.

In an example, each of the mapping relationship between the N and the M corresponds to at least one period when there are a plurality of mapping relationships between the N and the M, and the period corresponding to the mapping relationship between the N and the M is configured by the network equipment.

Therefore, in the present solution, a mapping relationship between N and M is pre-configured, the N is a maximum number of beams to obtain a cell quality, and the M is a number of beams actually sent by a network equipment. A user equipment may determine the value of N based on the mapping relationship and further solves the problem that the value of N cannot be uniformly configured.

Figure 4:
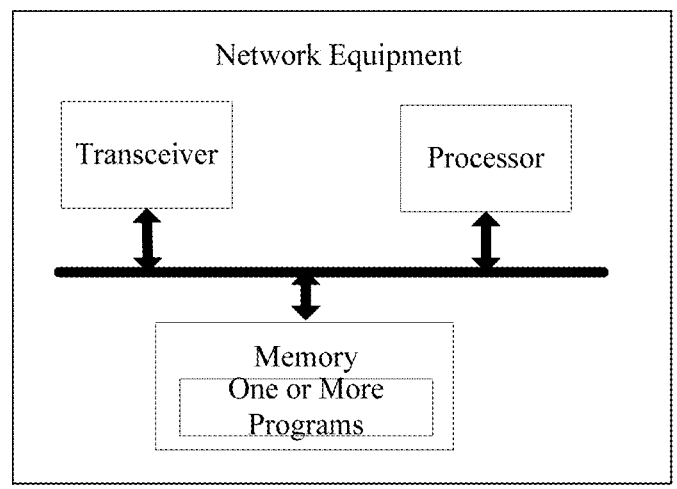
FIG. 4 is a block diagram of a network equipment according to an embodiment of the present disclosure.

Referring to FIG. 4, FIG. 4 is a network equipment 400 according to an embodiment of the present disclosure, comprising: one or more processors, one or more memories, one or more transceivers, and one or more programs.

The one or more programs are stored in the memory and configured to be executed by the one or more processors.

The program comprises instructions for performing the following step:

sending a mapping relationship between N and M. The N is a number of beams which need to be measured, the M is a number of beams actually supported by the network equipment, and the mapping relationship between the N and the M is used to determine the N.

In an example, in terms of sending configuration of a mapping relationship between N and M, the program is specifically used to execute instructions of the following step:

sending broadcast information or a dedicated signaling. The broadcast information or the dedicated signaling comprises the mapping relationship between the N and the M.

In an example, the program is further used to execute instructions of the following step:

sending system information, which the M is included in.

In an example, the program is further used to execute instructions of the following step:

sending synchronization information, which the M is included in.

In an example, the mapping relationship between the N and the M is a formula, $N=M/Z$, the Z is greater than or equals to 1, and the Z is configured by the network equipment.

In an example, each of the mapping relationship between the N and the M corresponds to at least one period when there are a plurality of mapping relationships between the N and the M, and the period corresponding to the mapping relationship between the N and the M is configured by the network equipment.

Therefore, in the present solution, a mapping relationship between N and M is pre-configured, the N is a maximum number of beams to obtain a cell quality, and the M is a number of beams actually sent by a network equipment. A user equipment may determine the value of N based on the mapping relationship and further solves the problem that the value of N cannot be uniformly configured.

Figure 5:
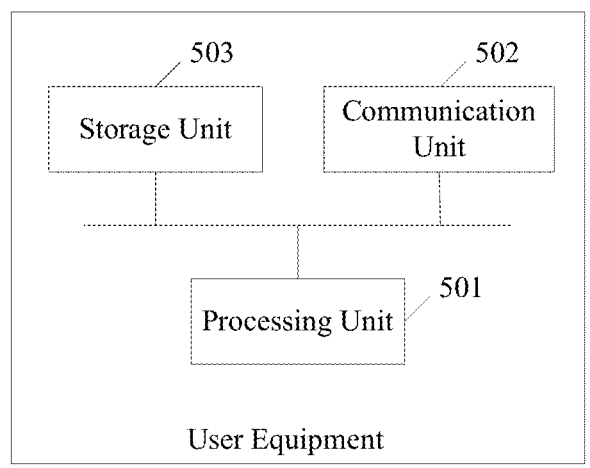
FIG. 5 is a block diagram of another user equipment according to an embodiment of the present disclosure.

Referring to FIG. 5, FIG. 5 is a block diagram of a user equipment 500 according to this embodiment. The user equipment 500 comprises a processing unit 501, a communication unit 502, and a storage unit 503:

The processing unit 501 is configured to obtain a mapping relationship between N and M, the N is a maximum number of beams for obtaining a cell quality, and the M is a number of beams actually sent by the network equipment; the N is determined based on the mapping relationship between the N and the M.

The processing unit 501 may be a processor or a controller (For example, it may be a Central Processing Unit (CPU), a general-purpose processor, a Digital Signal Processor (DSP), an Application-Specific Integrated Circuit (ASIC), a Field Programmable Gate Array (FPGA), or other programmable logic device, transistor logic device, hardware component, or any combination thereof. It may be a logical block or a module or a circuit that can implement or carry out various illustrative examples described in the present disclosure. The processor may also be a combination of computing functions, for example, including one or more microprocessor combinations, a combination of a DSP, a microprocessor, and the like). The communication unit 502 may be a transceiver, a transceiver circuit, a radio frequency chip, a communication interface, etc. The storage unit 503 may be a memory.

When the processing unit 501 is a processor, the communication unit 502 is a communication interface, and the storage unit 503 is a memory, the user equipment involved in the embodiments of the present disclosure may be the user equipment shown in FIG. 3.

Figure 6:
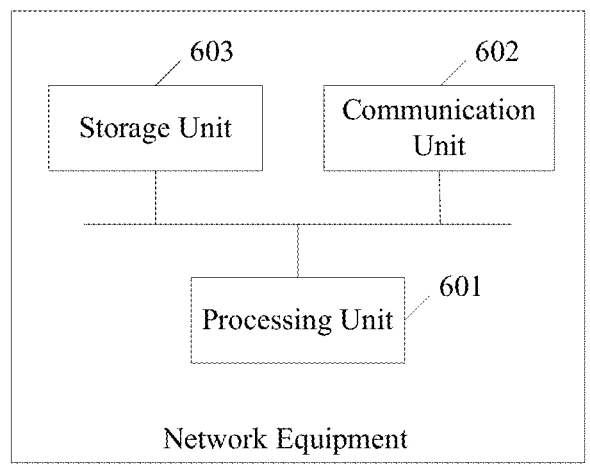
FIG. 6 is a block diagram of another network equipment according to an embodiment of the present disclosure.

Referring to FIG. 6, FIG. 6 is a block diagram of a network equipment 600 according to the present embodiment. The network equipment 600 comprises a processing unit 601, a communication unit 602 and a storage unit 603.

The processing unit 601 is configured to send, by using the communication unit 602, a configured mapping relationship between N and M, the N is a number of beams to be measured, the M is a number of beams actually supported by the network equipment, and the mapping relationship between the N and the M is used to determine the N.

The processing unit 601 may be a processor or a controller (For example, it may be a Central Processing Unit (CPU), a general-purpose processor, a Digital Signal Processor (DSP), an Application-Specific Integrated Circuit (ASIC), a Field Programmable Gate Array (FPGA), or other programmable logic device, transistor logic device, hardware component, or any combination thereof. It may be a logical block or a module or a circuit that can implement or carry out various illustrative examples described in the present disclosure. The processor may also be a combination of computing functions, for example, including one or more microprocessor combinations, a combination of a DSP, a microprocessor, and the like). The communication unit 602 may be a transceiver, a transceiver circuit, a radio frequency chip, a communication interface, etc. The storage unit 603 may be a memory.

When the processing unit 601 is a processor, the communication unit 602 is a communication interface, and the storage unit 603 is a memory, the network equipment involved in the embodiments of the present disclosure may be the network equipment shown in FIG. 4.

Figure 7:
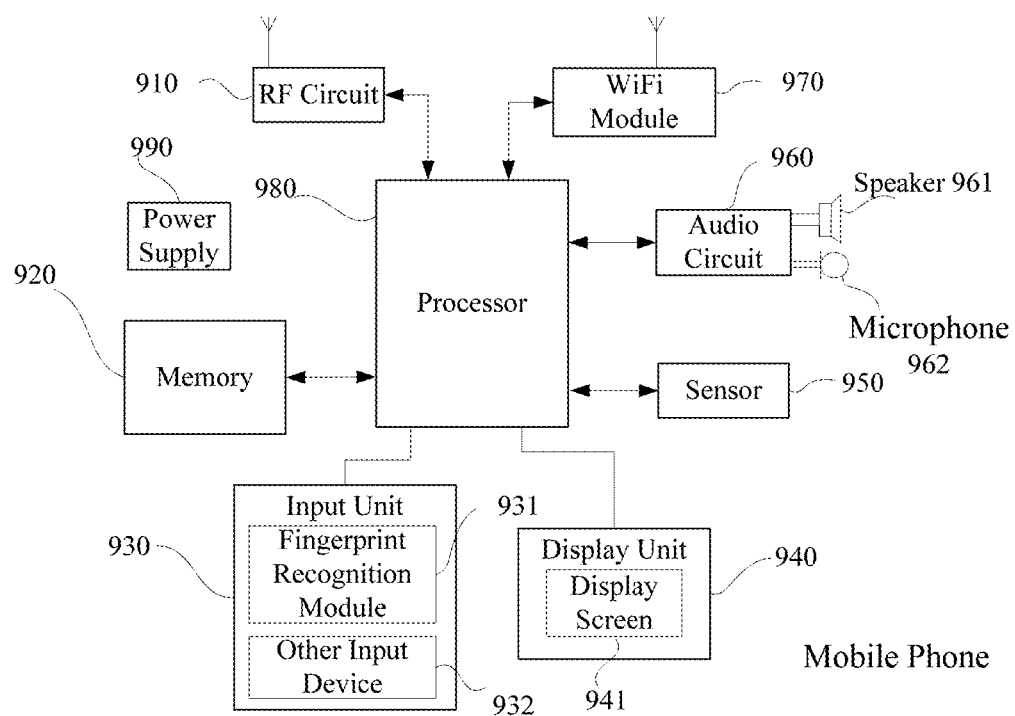
FIG. 7 is a block diagram of another user equipment according to an embodiment of the present disclosure.

Another user equipment is provided according to an embodiment of the present disclosure. As shown in FIG. 7, for the convenience of description, only parts related to the embodiment of the present disclosure are shown. If the specific technical details are not disclosed, refer to the method section of the embodiments of the present disclosure. The user equipment may be any user equipment including a mobile phone, a tablet computer, a PDA (Personal Digital Assistant), a POS (Point of Sales), a car computer and so on, and take that the user equipment is a mobile phone as an example:

FIG. 7 is a block diagram of a partial structure of a mobile phone related to a user equipment provided by an embodiment of the present disclosure. Referring to FIG. 7, the mobile phone comprises components: a Radio Frequency (RF) circuit 910, a memory 920, an input unit 930, a display unit 940, a sensor 950, an audio circuit 960, a Wireless Fidelity (WiFi) module 970, a processor 980, a power supply 990 and so on. It will be understood by those skilled in the art that the structure of the mobile phone shown in FIG. 7 does not constitute a limitation to the mobile phone. The mobile phone may comprise more or less components than those illustrated, or some components may be combined, or different components may be arranged.

The following describes the components of the mobile phone in detail with reference to FIG. 7:

The RF circuit 910 may be used for receiving and sending information. Generally, the RF circuit 910 comprises, but is not limited to, an antenna, at least one amplifier, a transceiver, a coupler, a Low Noise Amplifier (LNA), a duplexer, and the like. In addition, the RF circuit 910 may also communicate with the network and other equipments via wireless communication. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 920 may be used to store software programs and modules, and the processor 980 executes various functional applications and data processing of the mobile phone by running software programs and modules stored in the memory 920. The memory 920 may mainly include a program storage area and a data storage area. The program storage area may store an operating system, an application required for at least one function, and the like. The data storage area may store data created based on usage of the mobile phone and so on. Moreover, the memory 920 may comprise high-speed random access memory, and may also comprise a non-volatile memory, such as at least one magnetic disk storage device, flash memory device, or other volatile solid state storage device.

The input unit 930 may be configured to receive input numeric or character information and to generate key signal input related to user setting and function control of the mobile phone. Specifically, the input unit 930 may include a fingerprint identification module 931 and other input device 932. The fingerprint identification module 931 may collect fingerprint data of the user. In addition to the fingerprint recognition module 931, the input unit 930 may also include other input device 932. Specifically, other input device 932 may include, but is not limited to, one or more of a touch screen, a physical keyboard, a function key (such as a volume control button, a switch button), a trackball, a mouse, a joystick, and the like.

The display unit 940 may be used to display information input by the user or information provided to the user as well as various menus of the mobile phone. The display unit 940 may include a display screen 941. Alternatively, the display screen 941 may be configured in the form of a Liquid Crystal Display (LCD), an Organic Light-Emitting Diode (OLED), or the like. Although the fingerprint recognition module 931 and the display screen 941 implement the input and output functions of the mobile phone as two separate components in FIG. 7, the fingerprint recognition module 931 and the display screen 941 may be integrated to implement the input and playing functions of the mobile phone in some embodiments.

The mobile phone may also include at least one type of sensor 950, such as a light sensor, a motion sensor, and other sensors. Specifically, the light sensor may include an ambient light sensor and a proximity sensor. The ambient light sensor may adjust the brightness of the display screen 941 based on the brightness of the ambient light, and the proximity sensor may turn off the display screen 941 and/or back light when the mobile phone moves to the ear. As one kind of motion sensor, an accelerometer sensor can detect the magnitude of acceleration in all directions (usually three axes). When it is stationary, it can detect the magnitude and direction of gravity and it can be used for applications which identify the gesture of the mobile phone (such as horizontal and vertical screen switching, related games, magnetometer attitude calibration), vibration recognition related functions (such as pedometer, tapping), etc.; other sensors, which can also be configured on the mobile phone, such as a gyroscope, a barometer, a hygrometer, a thermometer and an infrared sensor, will not be described herein.

An audio circuit 960, a speaker 961, and a microphone 962 may provide an audio interface between the user and the mobile phone. The audio circuit 960 may send a converted electrical signal of the received audio data to the speaker 961 for conversion to the sound signal by the speaker 961; on the other hand, the microphone 962 converts the collected sound signal into an electrical signal, then the audio circuit 960 converted the received electrical signal into audio data, and then the audio data, after processed by the processor 980, is sent to another mobile phone via the RF circuit 910, or is stored in the memory 920 for further processing.

WiFi is a short-range wireless transmission technology, and the mobile phone may help users to send and receive emails, browse web pages, and access streaming media through the WiFi module 970, which provides users with wireless broadband internet access. Although FIG. 7 shows the WiFi module 970, it can be understood that it does not belong to the essential configuration of the mobile phone, and can be omitted as needed within the scope of not changing the essence of the disclosure.

The processor 980 is the control center of the mobile phone, which connects various parts of the entire mobile phone via various interfaces and lines. By running or executing software programs and/or modules stored in the memory 920, invoking data stored in the memory 920, and executing various functions and data processing of the mobile phone, the mobile phone is overall monitored. Optionally, the processor 980 may comprise one or more processing units. Preferably, the processor 980 may integrate an application processor and a modem processor. The application processor mainly processes an operating system, a user interface, an application and the like, and the modem processor primarily processes wireless communications. It can be understood that the above described modem processor may also not be integrated into the processor 980.

The mobile phone also includes a power supply 990 (such as a battery) that supplies power to the various components. Preferably, the power supply may be logically coupled to the processor 980 through a power management system in order to manage functions such as charging, discharging, and power consumption management through the power management system.

Although not shown, the mobile phone may further include a camera, a Bluetooth module, and the like, which will not be described herein again.

In the foregoing embodiment shown in FIG. 2, the processes on the side of the user equipment in each step of the method may be implemented based on the structure of the mobile phone.

In the foregoing embodiment shown in FIG. 5, each unit function may be implemented based on the structure of the mobile phone.

A computer readable storage medium is further provided in an embodiment of the present disclosure. The computer readable storage medium stores a computer program for electronic data exchange, and the computer program causes the computer to perform some or all of the steps described in the user equipment in the embodiments of the method as described above.

A computer readable storage medium is further provided in an embodiment of the present disclosure. The computer readable storage medium stores a computer program for electronic data exchange, and the computer program causes the computer to perform some or all of the steps described in the network equipment in the embodiments of the method as described above.

A computer program product is provided in an embodiment of the present disclosure. The computer program product comprises a non-transitory computer readable storage medium storing a computer program, and the computer program causes the computer to perform some or all of the steps described in the user equipment in the embodiments of the method as described above. The computer program product may be a software installation package.

A computer program product is provided in an embodiment of the present disclosure. The computer program product comprises a non-transitory computer readable storage medium storing a computer program, and the computer program causes the computer to perform some or all of the steps described in the network equipment in the embodiments of the method as described above. The computer program product may be a software installation package.

The steps of the method or algorithm described in the embodiments of the present disclosure may be implemented in a manner of hardware, or may be implemented by a processor executing software instructions. The software instructions may be composed of corresponding software modules. The software modules may be stored in a Random Access Memory (RAM), a flash memory, a Read Only Memory (ROM), an Erasable Programmable ROM (EPROM), an Electrically EPROM (EEPROM), a register, a hard disk, a removable hard disk, a CD-ROM or any other form of storage medium known in the art. An exemplary storage medium is coupled to the processor to enable the processor to read information from, and write information into, the storage medium. Of course, the storage medium may also be an integral part of the processor. The processor and the storage medium may locate in an ASIC. Additionally, the ASIC may be within an access network device, a target network device, or a core network device. Of course, the processor and the storage medium may also exist as discrete components in an access network device, a target network device, or a core network device.

Those skilled in the art should appreciate that in one or more of the above examples, the functions described in the embodiments of the present disclosure may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer may be a general purpose computer, a special purpose computer, a computer network, or other programmable device. The computer instructions may be stored in a computer readable storage medium, or transferred from one computer readable storage medium to another computer readable storage medium. For example, the computer instructions may be transferred from a website, computer, server or data center to another website, computer, server, or data center via wire (e.g. coaxial cable, fiber optic, Digital Subscriber Line (DSL)) or wireless (e.g. infrared, wireless, microwave). The computer readable storage medium may be any available media that can be accessed by a computer or a data storage device such as a server, a data center, or the like that includes one or more available medium. The available medium may be a magnetic medium (for example, a floppy disk, a hard disk, a magnetic tape), an optical medium (for example, a Digital Video Disc (DVD)), or a semiconductor medium (for example, a Solid State Disk (SSD)).

The specific embodiments described above have further illustrated the purpose, technical solutions and beneficial effects in detail. It should be understand that the above description is merely the specific implementations of the embodiments of the present disclosure and does not limit the scope of the embodiments of the present disclosure. Any modifications, equivalents, improvements and so on, which are based on the technical solutions of the embodiments of the present disclosure, shall fall within the scope of the embodiments of the present disclosure.

What is claimed is:

1. A method for information processing, comprising:
obtaining, by a user equipment, a mapping relationship between N and M, wherein the N is a maximum number of beams for obtaining a cell quality, and the M is a number of beams actually sent by a network equipment; and
determining, by the user equipment, the N based on the mapping relationship between the N and the M, and/or the M;
wherein each mapping relationship between the N and the M corresponds to at least one period when there are a plurality of mapping relationships between the N and the M, wherein the period corresponding to the mapping relationship between the N and the M is configured by the network equipment.

2. The method according to claim 1, the obtaining, by a user equipment, a mapping relationship between N and M comprising:
receiving, by the user equipment, broadcast information or a dedicated signaling from the network equipment, wherein the broadcast information or the dedicated signaling comprises the mapping relationship between the N and the M.

3. The method according to claim 2, wherein the dedicated signaling comprises a specific information element which is used to send the mapping relationship between the N and the M to the user equipment.

4. The method according to claim 1, further comprising:
receiving, by the user equipment, system information from the network equipment, wherein the M is included in the system information.

5. The method according to claim 4, wherein the system information includes common resource configuration information.

6. The method according to claim 1, further comprising:
receiving, by the user equipment, synchronization information from the network equipment, wherein the M is included in the synchronization information.

7. The method according to claim 6, further comprising:
measuring, by the user equipment, a cell beam after the N is determined and averaging a most N beams to obtain a cell quality where the network equipment is, wherein the most N beams are beams that meet a threshold of beam quality.

8. The method according to claim 7, wherein the threshold of beam quality is configured by the network equipment or pre-defined in the protocol.

9. The method according to claim 1, wherein the mapping relationship between the N and the M is a formula, N=M/Z, wherein the Z is greater than or equals to 1, and the Z is configured by the network equipment.

10. The method according to claim 1, wherein the mapping relationship between the N and the M corresponds to a table which records the value of N corresponding to the value of each M or each range of M values.

11. The method according to claim 1, wherein periods corresponding to different mapping relationships have no intersection between each other.

12. A user equipment, comprising one or more processors, one or more memories, one or more transceivers, and one or more programs;
wherein the one or more programs are stored in the memory and configured to be executed by the one or more processors;
wherein the program comprises instructions for performing steps in a method for information processing, wherein the method comprises:
obtaining, by a user equipment, a mapping relationship between N and M, wherein the N is a maximum number of beams for obtaining a cell quality, and the M is a number of beams actually sent by a network equipment; and
determining, by the user equipment, the N based on the mapping relationship between the N and the M, and/or the M;
wherein each mapping relationship between the N and the M corresponds to at least one period when there are a plurality of mapping relationships between the N and the M, wherein the period corresponding to the mapping relationship between the N and the M is configured by the network equipment.

13. The user equipment according to claim 12, wherein the obtaining, by a user equipment, a mapping relationship between N and M comprises:
receiving, by the user equipment, broadcast information or a dedicated signaling from the network equipment, wherein the broadcast information or the dedicated signaling comprises the mapping relationship between the N and the M.

14. The user equipment according to claim 12, wherein the method further comprises:
receiving, by the user equipment, system information from the network equipment, wherein the M is included in the system information.

15. The user equipment according to claim 12, wherein the method further comprises:
receiving, by the user equipment, synchronization information from the network equipment, wherein the M is included in the synchronization information.

16. The user equipment according to claim 15, wherein the method further comprises:
measuring, by the user equipment, a cell beam after the N is determined and averaging a most N beams to obtain a cell quality where the network equipment is, wherein the most N beams are beams that meet a threshold of beam quality.

17. The user equipment according to claim 12, wherein the mapping relationship between the N and the M is a formula, N=M/Z, wherein the Z is greater than or equals to 1, and the Z is configured by the network equipment.

* * * * *